(12) United States Patent
Kakinuma et al.

(10) Patent No.: US 9,256,077 B2
(45) Date of Patent: Feb. 9, 2016

(54) OPTICAL DEVICE

(75) Inventors: Akira Kakinuma, Osaka (JP); Keisuke Yoneda, Osaka (JP); Fumio Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 13/700,964

(22) PCT Filed: Jun. 13, 2011

(86) PCT No.: PCT/JP2011/003341
§ 371 (c)(1),
(2), (4) Date: Nov. 29, 2012

(87) PCT Pub. No.: WO2012/001891
PCT Pub. Date: Jan. 5, 2012

(65) Prior Publication Data
US 2013/0076998 A1    Mar. 28, 2013

(30) Foreign Application Priority Data

Jun. 30, 2010   (JP) ................... 2010-148434

(51) Int. Cl.
*G02F 1/1335* (2006.01)
*G02B 27/22* (2006.01)
(Continued)

(52) U.S. Cl.
CPC ............ *G02B 27/2264* (2013.01); *G02C 11/10* (2013.01); *H04N 13/0438* (2013.01); *G02F 2001/294* (2013.01); *H04N 2213/008* (2013.01)

(58) Field of Classification Search
CPC .. G02B 27/2264; G02B 27/22; G02B 27/017; G02B 27/2228; G02B 2027/0178; H04N 13/0438; H04N 2213/008; H04N 2213/001; G02C 7/101; G02C 7/083; G02C 7/14; G02C 11/10; G02C 5/00; G02C 5/146; G02C 5/2254; G02C 9/04; A61F 9/08; A61N 1/36046; G02F 1/1313; G02F 1/13; G02F 1/163; G02F 2001/291; G02F 1/1335; H01M 10/482; Y02E 60/12
USPC ......... 351/158, 44, 41, 113; 349/13; 359/464, 359/466; 607/54; 315/160; 320/103, 118, 320/167; 324/426
See application file for complete search history.

(56) References Cited

U.S. PATENT DOCUMENTS 4,655,564 A * 4/1987 Czech ............................. 351/41
5,359,444 A * 10/1994 Piosenka et al. ................ 349/13
(Continued)

FOREIGN PATENT DOCUMENTS

| JP | 09-005674 A | 1/1997 |
|----|-------------|--------|
| JP | 2005-352024 A | 12/2005 |

(Continued)

OTHER PUBLICATIONS

International Search Report mailed Sep. 13, 2011 issued in corresponding International Application No. PCT/JP2011/003341.

*Primary Examiner* — Thoi Duong
(74) *Attorney, Agent, or Firm* — McDermott Will & Emery LLP

(57) ABSTRACT

Disclosed is an optical device which includes: optical components configured to be electrically actuated such that light transmission states are variable; a driver circuit for the optical components; a power source unit for driving the optical components; rims for supporting the optical components; temples having front and rear ends and connected at the front ends to the rims; and earpieces formed at the rear ends of the temples. The power source unit includes a secondary battery, and a charge/discharge circuit for controlling charge and discharge of the secondary battery. The secondary battery is provided near the rear end of the temple or in the earpiece.

5 Claims, 4 Drawing Sheets

(51) Int. Cl.
  *G02C 11/00* (2006.01)
  *H04N 13/04* (2006.01)
  *G02F 1/29* (2006.01)

(56) References Cited

U.S. PATENT DOCUMENTS

| | | | |
|---|---|---|---|
| 5,455,637 A * | 10/1995 | Kallman et al. | 351/44 |
| 6,619,799 B1 | 9/2003 | Blum et al. | |
| 8,016,415 B2 * | 9/2011 | Figler et al. | 351/158 |
| 2001/0038491 A1 * | 11/2001 | Fergason | 359/466 |
| 2004/0156012 A1 * | 8/2004 | Jannard et al. | 351/158 |
| 2005/0275714 A1 | 12/2005 | Ishikawa et al. | |
| 2008/0180630 A1 | 7/2008 | Clarke et al. | |
| 2010/0177277 A1 | 7/2010 | Kokonaski et al. | |
| 2011/0037946 A1 | 2/2011 | Blum et al. | |
| 2011/0181700 A1 | 7/2011 | Oshima et al. | |
| 2011/0194069 A1 | 8/2011 | Blum et al. | |

FOREIGN PATENT DOCUMENTS

| | | |
|---|---|---|
| JP | 2009-093201 A | 4/2009 |
| JP | 2009-098655 A | 5/2009 |
| JP | 2009-540386 A | 11/2009 |
| JP | 2010-020898 A | 1/2010 |
| JP | 2010-022067 A | 1/2010 |
| JP | 2010-517082 A | 5/2010 |
| JP | 2010-522903 A | 7/2010 |

* cited by examiner

OPTICAL DEVICE

RELATED APPLICATIONS

This application is the U.S. National Phase under 35 U.S.C. §371 of International Application No. PCT/JP2011/003341, filed on Jun. 13, 2011, which in turn claims the benefit of Japanese Application No. 2010-148434, filed on Jun. 30, 2010, the disclosures of which Applications are incorporated by reference herein.

TECHNICAL FIELD

The present invention relates to optical devices, more specifically to a technology for improving the comfort of an optical device with a built-in battery to be worn on the head of a user.

BACKGROUND ART

Some stereoscopic image viewing devices (simply referred to below as viewing devices) generally called 3D eyeglasses or 3D glasses support active system and some support passive system.

In the active system, a right-eye image and a left-eye image are displayed on a display device, such as a television, while being alternatingly switched therebetween. On the other hand, on a viewing device, liquid crystal shutters or suchlike disposed on right and left lens portions are alternatingly opened/closed in synchronization with switching of images on the display device (see Patent Literatures 1 and 2).

Display devices used with the active system are structured approximately in the same manner as conventional display devices. In addition, simply using stereoscopic image data as image data to be displayed on the display devices allows stereoscopic image viewing.

On the other hand, in the passive system, right-eye and left-eye images are simultaneously displayed line-by-line on the display device, and in the display device, a polarizing filter sorts the images for the right eye and the left eye. Then, the sorted images are respectively delivered to the right eye and the left eye through specialized eyeglasses. Accordingly, in the passive system, 3D images in some cases could not be properly viewed unless the images are viewed generally in front of the display device. Moreover, since the right-eye and left-eye images are displayed on one screen at the same time, the resolution is low. Therefore, for viewing on a household television, the active stereoscopic image viewing system is preferable for users.

However, in the active system, the viewing device is required to include liquid-crystal optical shutters and a power source for driving them, so that the viewing device becomes heavier and bulkier than normal eyeglasses. Therefore, many users feel discomfort with wearing the viewing device.

Accordingly, active stereoscopic image viewing systems are desired to have lighter viewing devices for improved comfort of wearing. Currently, it is the mainstream practice to use a small, lightweight, coin-shaped primary battery for a drive power source. Also, to achieve a lighter viewing device, it is under study to use a laminated battery as a drive power source since laminated batteries can be rendered thinner more easily than coin-shaped batteries.

Furthermore, attention is drawn by a technology in which eyeglass lenses include electroactive elements made of liquid crystals. Current to be applied to the electroactive elements is adjusted to instantaneously change the lenses' power (refractive power) or focal point (see Patent Literatures 3, 4, and 5).

This technology makes it possible to achieve eyeglasses (referred to below as variable focus eyeglasses) in which the power of myopia correction eyeglass lenses can be partially changed to a power for hyperopia correction as necessary or the power for the entire field of view of eyeglass lenses can be switched between powers for myopia correction and hyperopia correction as necessary. This makes it possible to achieve a satisfactory field of view without distortion when compared to general, so-called bifocal eyeglasses or suchlike.

CITATION LIST

Patent Literatures

Patent Literature 1: Japanese Laid-Open Patent Publication No. 2010-022067
Patent Literature 2: Japanese Laid-Open Patent Publication No. 2010-020898
Patent Literature 3: Japanese PCT National Phase Laid-Open Patent Publication No. 2010-517082
Patent Literature 4: Japanese PCT National Phase Laid-Open Patent Publication No. 2009-540386
Patent Literature 5: Japanese PCT National Phase Laid-Open Patent Publication No. 2010-522903

SUMMARY OF INVENTION

Technical Problem

As described above, so-called 3D eyeglasses often include batteries as power sources for driving liquid crystal shutters. In addition, variable focus eyeglasses are planned to include batteries to obtain current to be applied to liquid crystal materials. However, as with normal eyeglasses, these devices are intended to be worn on the head with their weight supported on the nose and the ears. Accordingly, a significant increase in weight due to inclusion of liquid crystal shutters and a battery seriously compromises the comfort of wearing.

To prevent such an increase in the weight of an optical device with a built-in battery, it is effective to reduce the weight of the built-in battery. However, a reduction in the battery weight leads to a reduction in capacity. The reduced battery capacity results in the need to frequently change or recharge the battery. This might cause the user to feel additional discontent.

Therefore, an objective of the present invention is to improve the comfort of wearing an optical device with a built-in battery intended to be worn on the head, without such a weight reduction to increase the frequency of battery changes.

Solution to Problem

The present invention is directed to an optical device including:
optical components configured to be electrically actuated such that light transmission states are variable;
a driver circuit for the optical components;
a power source unit for driving the optical components;
rims for supporting the optical components;
temples having front and rear ends, and connected at the front ends to the rims; and
earpieces formed at the rear ends of the temples,
the power source unit including:
a secondary battery; and
a charge/discharge circuit for controlling charge and discharge of the secondary battery, and the secondary battery being provided near the rear end of the temple or in the earpiece.

For example, the present invention is directed to an eyewear-like stereoscopic image viewing device including:
  a right-eye optical shutter;
  a left-eye optical shutter;
  a driver circuit for the optical shutters;
  a power source unit for driving the optical shutters;
  rims for supporting the optical shutters;
  temples having front and rear ends, and connected at the front ends to the rims; and
  earpieces formed at the rear ends of the temples,
  the power source unit including:
  a cylindrical secondary battery; and
  a charge/discharge circuit for controlling charge and discharge of the secondary battery, and
  the secondary battery being provided near the rear end of the temple or in the earpiece.

Advantageous Effects of Invention

Optical devices such as active stereoscopic image viewing devices and variable focus eyeglasses have electrically actuated optical components, such as optical shutters and variable focus lenses, supported by rims on the front side. Accordingly, the weight tends to be imbalanced toward the front. In the present invention, a secondary battery used in a power source unit is cylindrically or rectangularly shaped, for example, and is provided near the rear end of a temple or in an earpiece, thereby optimizing weight balance without compromising design of the optical device. By optimizing weight balance, the comfort of wearing the optical device can be improved without an excessive reduction in battery weight.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

The present invention is directed to an optical device including:
  optical components configured to be electrically actuated such that light transmission states are variable;
  a driver circuit for the optical components;
  a power source unit for driving the optical components;
  rims for supporting the optical components;
  temples having front and rear ends, and connected at the front ends to the rims;
  and earpieces formed at the rear ends of the temples.

The power source unit includes a secondary battery, either cylindrical or rectangular, for example, and a charge/discharge circuit for controlling charge and discharge of the secondary battery. In addition, the secondary battery of the power source unit is provided near the rear end of the temple or in the earpiece.

An example of the optical device is an eyewear-like stereoscopic image viewing device generally called 3D eyeglasses or 3D glasses. Among such stereoscopic image viewing devices, stereoscopic image viewing devices (also simply referred to below as viewing devices) particularly compatible with active shutter system often include liquid-crystal optical shutters and power source units or suchlike for driving the shutters. However, liquid-crystal optical shutters are heavier (e.g., 7 g to 20 g each) than plastic lenses of normal eyeglasses (for lightweight lenses, 4 g to 6 g each).

In eyewear-like stereoscopic image viewing devices, such heavy optical shutters are disposed on the front side. Accordingly, the center of gravity of the devices is more at the front compared to that of normal eyeglasses. Moreover, conventional viewing devices use coin-shaped batteries (primary batteries) or laminated batteries, which have certain sizes of area, as power sources. Accordingly, it is necessary to provide housing portions with certain sizes of area in the viewing devices.

Figure 1:
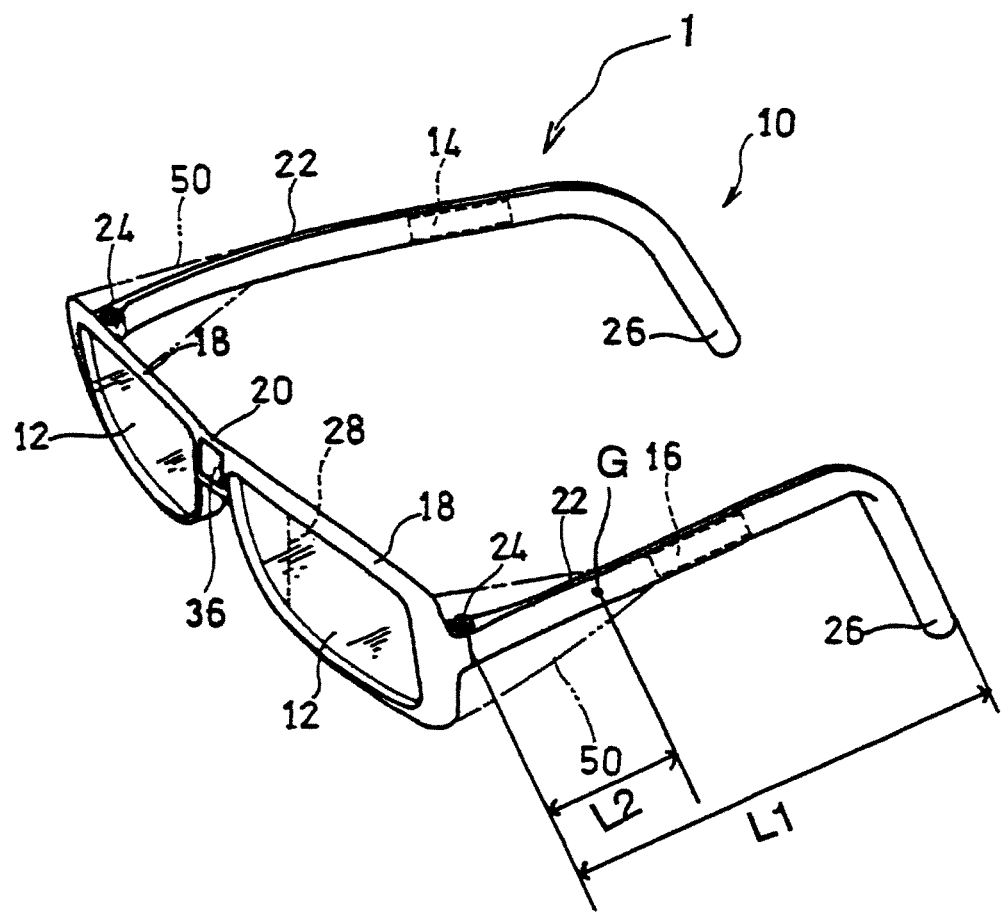
FIG. 1 is an oblique view illustrating the appearance of a stereoscopic image viewing device as an optical device according to an embodiment of the present invention.

For design reasons, such housing portions often disposed in wider portions 50 provided on the front side of temples 22, as indicated by long dashed double-short dashed lines in FIG. 1. Accordingly, the weight becomes imbalanced further toward the front.

In general, eyeglasses are supported by the nose and the ears. When the weight of a viewing device is imbalanced toward the front, the weight of the viewing device is mainly put on the nose. As a result, the viewing device frequently slides down due to perspiration or slight movement of the head. Accordingly, the comfort of wearing is extremely impaired.

In the present invention, the secondary battery, either cylindrical or rectangular, for example, is used as the power source unit, so that the battery housing portion can be provided near the rear end of the temple or in the earpiece without sacrificing design. As a result, the center of gravity of the viewing device moves rearward, so that the viewing device can be effectively supported by not only the nose but also the ears. Thus, load is dispersed, improving the comfort of wearing. Moreover, the viewing device is kept on the ears and is inhibited from sliding down. Thus, the comfort of wearing is dramatically improved.

The foregoing is not limited to viewing devices such as so-called 3D eyeglasses, and generally applies to optical devices designed to be worn on the head (or the face) and including optical components electrically actuated such that light transmission states are variable. Such optical devices often include secondary batteries as power sources for driving optical components. Accordingly, they share the same challenge of enhancing the comfort of wearing without excessively reducing the weight of secondary batteries to be included.

Here, to improve the comfort of wearing, distance $L_2$ between the front end of the temple and center of gravity G of the entire optical device along a direction in which the temple extends is preferably 15% to 50% of distance $L_1$ between the front end of the temple and the rear end of the earpiece along the direction in which the temple extends. A more preferable range is from 20% to 35%.

Furthermore, by setting the cylindrical or rectangular secondary battery with a diameter or width of 2 mm to 6 mm, it is rendered possible to eliminate the need to particularly widen the temples and other portions even in the case where the secondary battery is to be included therein, thereby further facilitating design improvements. In general, cylindrical or rectangular batteries include metal can casings. In addition, these shapes are resistant to an increase in internal pressure, and therefore a large amount of material can be accommodated even in a small volume. Moreover, high resistance to external force provides suitability for inclusion in flexible portions of the optical device, such as temples and earpieces. Here, the term "rectangular" encompasses shapes where the cross section is elliptical or the cross section includes a pair of straight segments and has arc-like portions on opposite sides. Herein, the width of the rectangular secondary battery refers to the length of the major axis of the cross section.

In a stereoscopic image viewing device according to an embodiment of the present invention, at least a portion of the driver circuit or the charge/discharge circuit is provided near the rear end of the temple or in the earpiece.

As a result, the weight of the viewing device, which tends to be much heavier on the front side, can be distributed further rearward. Thus, the comfort of wearing can be further improved. In this case, the driver circuit and the power source unit can be separately distributed in the left and right temples (e.g., the power source unit is arranged on the right side, and the driver circuit on the left side), thereby achieving proper right-left weight balance. Thus, the comfort of wearing can be further enhanced.

In a stereoscopic image viewing device according to another embodiment of the present invention, a hollow portion is provided near the rear end of the temple or in the earpiece, and has the secondary battery accommodated therein.

With this configuration, the secondary battery is built in the temple or the earpiece, and therefore the secondary battery can be provided near the rear end of the temple or in the earpiece without causing the user to be aware of the presence of the secondary battery. In this case, if the temple or the earpiece is made of resin, the secondary battery can be built therein by insert molding. This further increases the flexibility in designing the viewing device.

As described above, the optical components of the present invention are, by way of example, liquid-crystal optical shutters for viewing 3D images. In this case, the driver circuit drives the liquid-crystal optical shutters in synchronization with switching between two types of images, i.e., right-eye and left-eye images, alternatingly displayed on an external image display device.

In another example, each of the optical components of the present invention includes an electroactive material whose refractive index varies upon activation through application of a voltage greater than or equal to a predetermined value. In this case, the driver circuit activates the electroactive material by applying the voltage greater than or equal to the predetermined value to the electroactive material under a predetermined condition. Here, for example, the predetermined condition refers to an instruction provided by the user's button operation or an instruction from a sensor means for sensing the user's predetermined action (e.g., the action of lowering the head). As the electroactive material, a cholesteric liquid crystal material can be used, for example.

(Embodiment 1)

Hereinafter, an embodiment of the present invention will be described with reference to the drawings.

Figure 2:
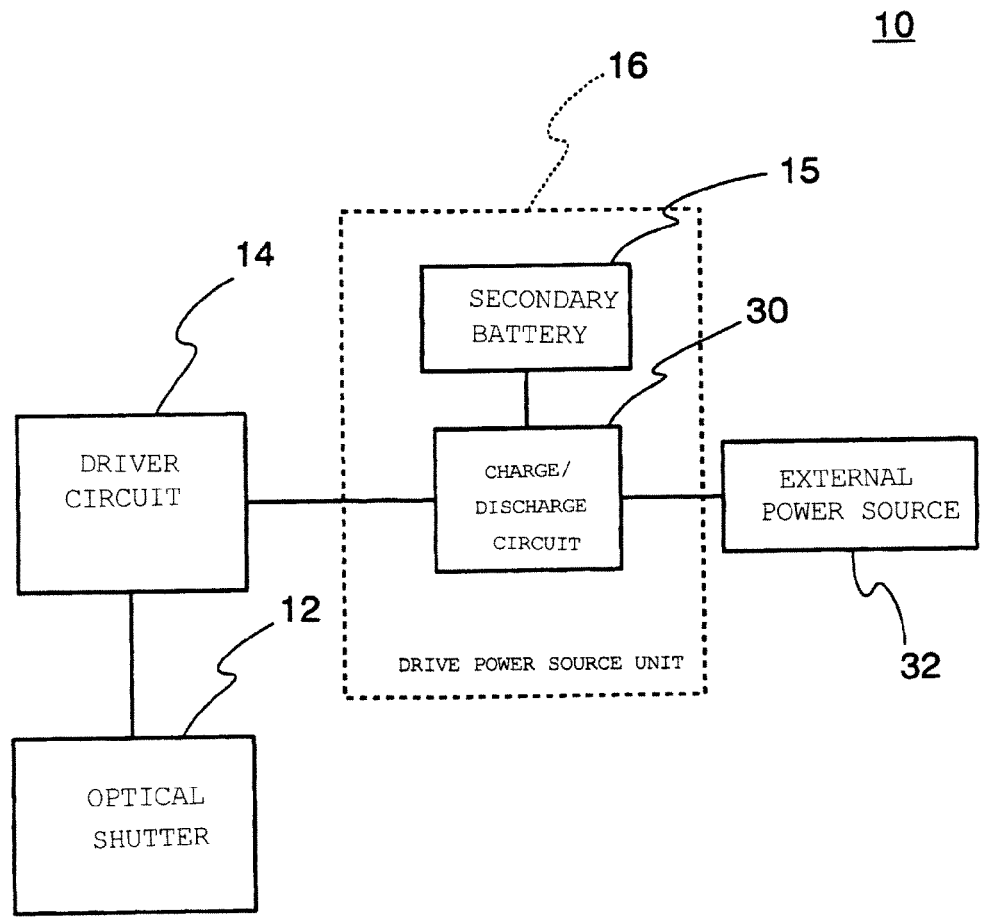
FIG. 2 is a functional block diagram of the stereoscopic image viewing device in FIG. 1.

FIG. 1 is an oblique view of a stereoscopic image viewing device as an optical device according to Embodiment 1 of the present invention. FIG. 2 shows a functional block diagram of the stereoscopic image viewing device.

The stereoscopic image viewing device (referred to below as the viewing device) 10 is an eyewear-like viewing device compatible with an active-shutter stereoscopic image viewing system.

The active-shutter stereoscopic image viewing system is a system for viewing stereoscopic images in which right-eye and left-eye images are displayed on a display device such as a 3D television while being alternatingly switched at high speed, and optical shutters of the viewing device 10 are alternatingly opened/closed in synchronization with the switching of images on the display device.

In the viewing device 10, right-eye and left-eye optical shutters 12 have unillustrated electrodes connected to a driver circuit 14, which is in turn connected to a power source unit 16 for driving the optical shutters 12. The power source unit 16 includes a secondary battery 15 and a charge/discharge circuit 30 for controlling charge and discharge of the secondary battery 15. The charge/discharge circuit 30 is connected to the driver circuit 14. The charge/discharge circuit 30 is connected to the secondary battery 15, and can be connected to an external power source 32 such as a commercial power source.

The optical shutters 12 are held by a pair of rims 18, respectively. The pair of rims 18 are connected at their inside edges to each other via a bridge 20. Each of the rims 18 is pivotably connected at its outside edge to the front end of a temple 22 via a hinge 24. The temple 22 has an earpiece 26 formed at the rear end. Each rim 18 has a nose pad 28 formed near the bridge 20. The pair of rims 18, the bridge 20, the temples 22, the hinges 24, the earpieces 26, and the nose pads 28 constitute a frame 1.

The unillustrated display device (such as a 3D television) transmits a synchronization signal specifying the timing of opening and closing the optical shutters 12, and the bridge 20 is provided with an unillustrated reception portion for receiving the synchronization signal. The synchronization signal received by the reception portion is transmitted to the driver circuit 14.

As the optical shutters 12, liquid-crystal optical shutters are preferably used from the viewpoint of operation speed and quietness. Liquid-crystal optical shutters operate so as to become transparent upon voltage application and opaque upon cessation of voltage application.

Figure 3:
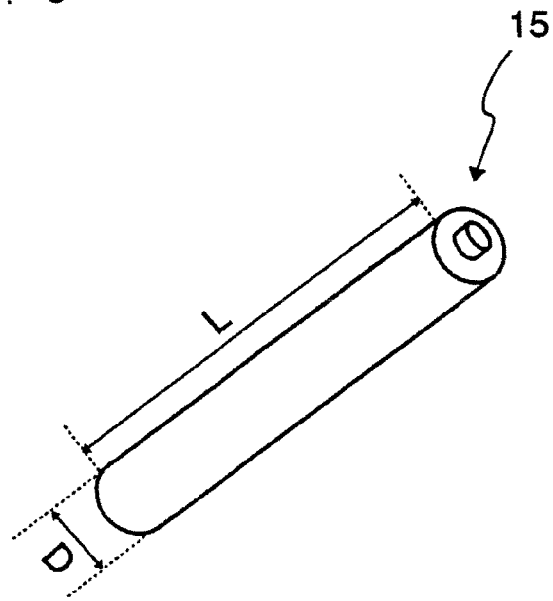
FIG. 3 is an oblique view illustrating the appearance of a secondary battery.

FIG. 3 is an oblique view of the appearance of a secondary battery. The secondary battery 15 has an elongated shape 2 mm to 6 mm in diameter or width D and 15 mm to 35 mm in length L. As the secondary battery 15, a non-aqueous electrolyte secondary battery, in particular, a lithium-ion secondary battery, is preferably used in view of high energy density. Note that the secondary battery 15 is not limited to a cylindrical shape as shown in the figure, and secondary batteries of various shapes such as a rectangular shape can be used. In general, cylindrical or rectangular batteries include metal can casings. In addition, the term "rectangular" refers to a shape corresponding to a rectangular battery as it is called in the field of battery, and the tube portion has at least a pair of parallel planes. The rectangular shape encompasses a thin flat shape with rounded edges. Moreover, the width of a rectangular secondary battery refers to the greater of the widths where there are narrow and wide widths.

The secondary battery 15 is sized and shaped as mentioned above so that it can be disposed near the rear end of the temple 22 or in the earpiece 26 without sacrificing design.

Here, setting the secondary battery 15 to be 2 mm or more in diameter D facilitates easy manufacturing of the secondary battery 15 compared to the case where diameter D is smaller, resulting in reduced production cost. Moreover, it is ensured that the secondary battery 15 can have a satisfactory capacity. On the other hand, the reason for the secondary battery 15 to be 6 mm or less in diameter D is to dispose the secondary battery 15 at the rear of the viewing device more readily without compromising design when compared to the case where diameter D is greater.

Furthermore, using a secondary battery in the power source unit 16 eliminates the need to frequently change the battery, resulting in easier use of the viewing device 10. The capacity of the secondary battery 15 can be in the range from 10 mAh to 100 mAh, for example.

As shown in FIG. 1, the viewing device 10 as illustrated has the driver circuit 14 disposed near the rear end of the right temple 22 (on the depth side of the figure) and the power source unit 16 disposed near the rear end of the left temple 22 (on the front side of the figure). The arrangement of the components is not limited to this, and at least one or all of the constituent elements of the power source unit 16 and the driver circuit 14 can be disposed at the left and right earpieces 26.

In an example, the secondary battery can be disposed in the earpiece 26 which is positioned further rearward from the above rear end position of the left temple 22, in order to achieve a right-left weight balance with the driver circuit 14, which is relatively heavy. To allow such weight balance to be distributed near the rear as much as possible, all of the constituent elements of the power source unit 16 and the driver circuit 14 may be disposed in the earpieces 26.

Here, it is not requisite to dispose the driver circuit 14 and the power source unit 16 entirely near the rear ends of the temples 22 or in the earpieces 26, and the driver circuit 14 and the power source unit 16 can be disposed in part (e.g., the charge/discharge circuit 30) near the front ends of the temples 22 or in the rims 18. However, the secondary battery 15 and the driver circuit 14 are relatively heavy and therefore preferably provided near the rear ends of the temples 22 or in the earpieces 26.

In this case, the driver circuit 14 and the power source unit 16 are desirably positioned such that, where the distance between the front end of the temple 22 (e.g., the center point on the shaft of the hinge 24) and the tip of the earpiece 26 (the distance along the direction in which the temple extends) is taken as 100%, center of gravity G of the viewing device 10 is positioned at a distance of 15% to 50% from the front end of the temple 22. When the center of gravity of the viewing device 10 is within the above range, the comfort of wearing the viewing device 10 is good, as described in examples below.

Figure 4:
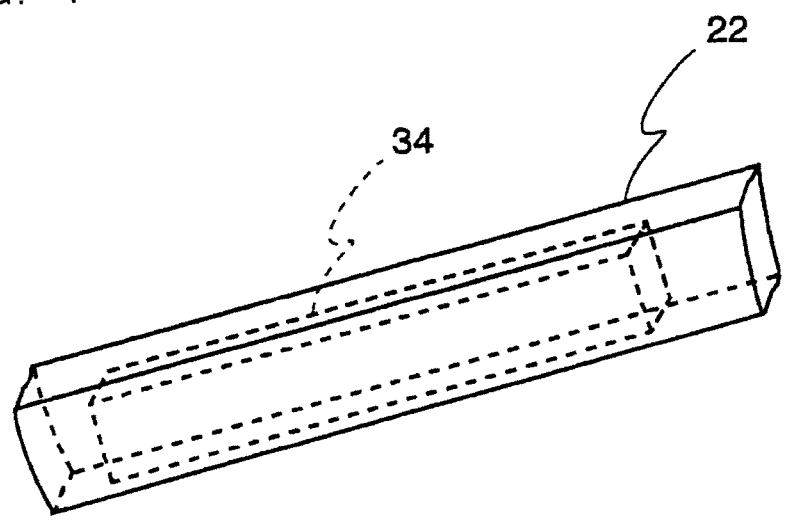
FIG. 4 is an enlarged perspective view of a temple, schematically illustrating the configuration of a housing portion for a power source unit and a driver circuit.

FIG. 4 illustrates an exemplary housing portion for accommodating the driver circuit and the power source unit. The housing portion 34 is formed as a hollow portion provided in each of the right and left temples 22, to accommodate the driver circuit 14 and the power source unit 16 within the temples 22. The housing portion 34 can be provided with a lid that can be opened and closed.

The shape of the housing portion 34 is not limited to a rectangular shape as shown in the figure, and if the cross section of the temple 22 is rounded, the housing portion 34 can be cylindrical or suchlike correspondingly. The size of the housing portion 34 is appropriately set in accordance with the size of an object to be accommodated therein. Alternatively, the housing portion 34 may be provided in the earpieces 26.

The housing portion 34 is formed as a hollow portion provided in each of the temples 22 or the earpieces 26, so that portions of the driver circuit 14 and the power source unit 16, in particular the secondary battery 15, the size of which is relatively difficult to reduce, can be accommodated within the temples 22 or the earpieces 26 without causing the user to be aware of their presence. This broadens the choice of designs of the viewing device 10, making it easy to improve the appearance.

Furthermore, since the power source unit 16 uses the secondary battery 15 in place of a conventional primary battery, there is less need to change the battery. Therefore, the power source unit 16 and the driver circuit 14 may be built in the temples 22 or the earpieces 26 through embedding by insert molding if the temples 22 or the earpieces 26 are made of resin. This further increases the flexibility in designing the viewing device.

(Embodiment 2)

Next, Embodiment 2 of the present invention will be described.

Figure 5:
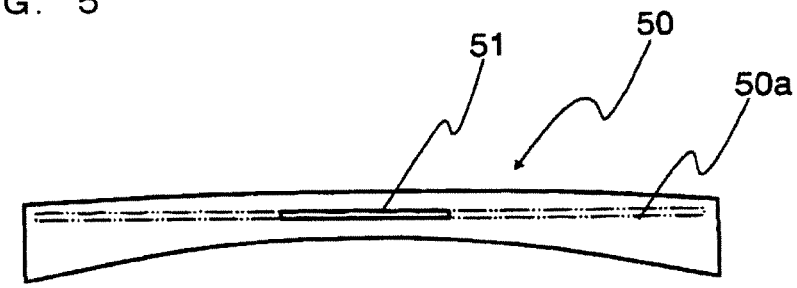
FIG. 5 is a diagram schematically illustrating a lens for use in variable focus eyeglasses embodied as an optical device according to another embodiment of the present invention, as viewed from a direction perpendicular to an incident direction of light.

FIG. 5 illustrates a lens for use in variable focus eyeglasses embodied as an optical device according to Embodiment 2, as viewed from a direction perpendicular to an incident direction of light. The appearance of the variable focus eyeglasses themselves is similar to the viewing device in FIG. 1. Accordingly, descriptions of similar portions will be given using reference characters in FIG. 1. In addition, the thickness ratio and other ratios among the portions shown in FIG. 5 are different from actualities for convenience of viewing.

The lens 50 illustrated in the figure includes a base lens 50a, and a planar electroactive element 51 embedded in the base lens 50a. For example, a normal optical lens (concave lens) for myopia correction can be used as the base lens 50a. The electroactive element 51 is a device having a refractive index variable in response to application of electrical energy. The electroactive element 51 is in optical communication with the base lens 50a. Such a lens 50 can be attached to the frame 1 (more specifically, the rim 18) in FIG. 1. Note that the electroactive element 51 can be attached to the surface of the base lens 50a, rather than in the inside.

The electroactive element 51 can be disposed across the entire or partial field of view of the lens 50. In FIG. 5, long dashed double-short dashed lines indicate the electroactive element 51 being disposed across the entire field of view of the lens 50. The electroactive element 51 can be planar as illustrated in the figure or can be bent along the curved surface of the lens. Moreover, the electroactive element 51 can be disposed in each or only one of the pair of lenses 50. Moreover, the number of electroactive elements 51 disposed in the lens 50 is not limited to one. Two or more electroactive elements 51 can be disposed in one lens 50. For example, each lens 50 can be merely transparent without a refractive power for myopia or hyperopia correction, and can have disposed therein both an electroactive element 51 that exerts a refractive power for myopia correction upon activation and an electroactive element 51 that exerts a refractive power for hyperopia correction upon activation.

When the electroactive element 51 is disposed over only a portion of the entire field of view of the lens 50, the position of the electroactive element 51 in the lens 50 is not specifically limited. In an example, the electroactive element 51 can be disposed in such a position that overlaps with the user's viewing direction when the user looks down, i.e., the electroactive element 51 can be provided in the center of a lower part of the lens 50.

Figure 6:
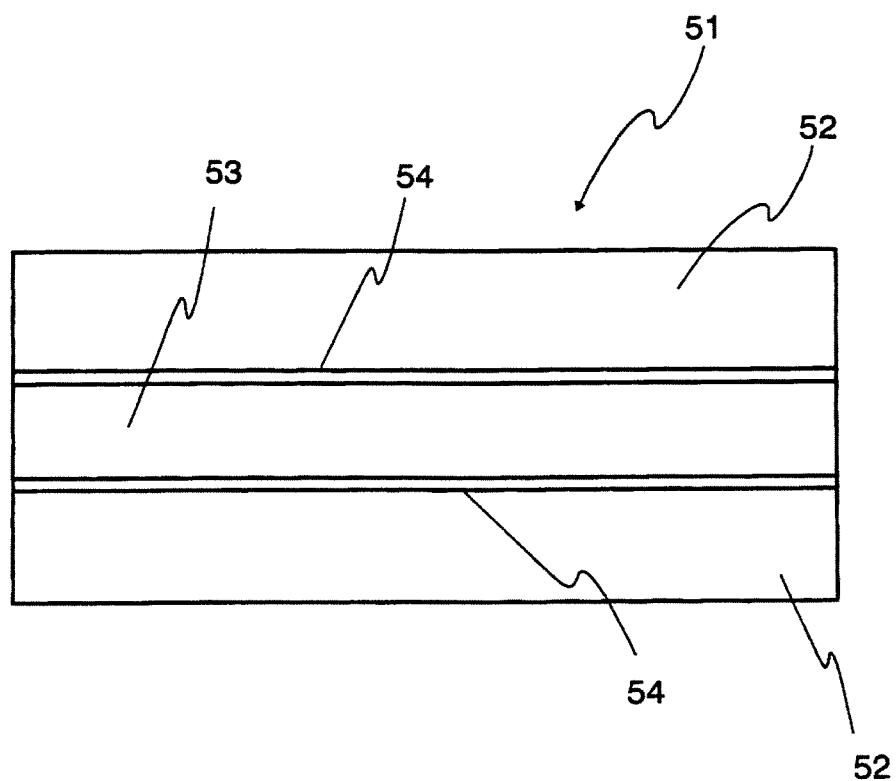
FIG. 6 is a diagram schematically illustrating a layered structure of an electroactive element for use in the variable focus eyeglasses.

FIG. 6 illustrates a cross-sectional view of an exemplary electroactive element. In this figure, the thickness to width ratio of the electroactive element 51 and the thickness ratio among the layers do not reflect actualities. In the figure, the electroactive element 51 is mainly enlarged in the thickness direction.

The electroactive element 51 illustrated in the figure includes two transparent substrates 52 and an electroactive material 53 provided therebetween and made of a thin layer of liquid crystal material. The substrates 52 are formed so as to contain the electroactive material 53 therebetween and ensure that the electroactive material 53 cannot leak therefrom. The thickness of each substrate 52 is, for example, greater than 100 μm but less than 1 mm, preferably on the order of 250 μm. The thickness of the electroactive material 53 can be, for example, less than 100 μm, preferably, less than 10 μm.

One of the two substrates 52 can form a part of the base lens 50a. In such a case, one of the substrates 52 can be essentially thicker than the other. In such a mode, the substrate that forms a part of the base lens 50a can have a thickness of on the order of 1 mm to 12 mm, for example. The other substrate 52 can have a thickness greater than 100 μm but less than 1 mm, preferably on the order of 250 μm.

The two substrates 52 can have the same refractive index. The electroactive material 53 can include liquid crystals. Liquid crystals have a refractive index variable upon generation of electric fields across the liquid crystals, and therefore are particularly suitable for the electroactive material 53. The liquid crystal material is preferably insensitive to polarized light. As the liquid crystal material, a cholesteric liquid crystal material can be appropriately used. The cholesteric liquid crystal material can include nematic liquid crystals with a birefringence of about 0.2 or more. The cholesteric liquid crystal material can further include chiral dopants with a helical twisting power of about 1.1 ($\mu m^{-1}$) or more. The electroactive material 53 can have an average refractive index approximately equal to the aforementioned refractive index.

Each substrate 52 has an optically transparent electrode 54 provided on its surface that contacts the electroactive material 53. Once the electroactive material 53 is activated through voltage application by the electrode 54, the refractive index of the electroactive material 53 changes, so that optical characteristics, such as focal distance and diffraction efficiency, of the electroactive material 53 change. The electrode 54 can include any known transparent conductive oxide (e.g., ITO (indium tin oxide) or tin-doped indium oxide) or conducting organic material (e.g., PEDOT:PSS (Poly(3,4-ethylenedioxythiophene)poly(styrenesulfonate)), carbon nanotube, or the like), for example. The thickness of the electrode 54 can be less than 1 μm, for example, preferably, less than 0.1 μm.

The electroactive element 51 can be switched between first and second refractive indices, and can have a first refractive power in an inactive state where applied voltage is less than a first predetermined value $E_1$ and a second refractive power in an active state where applied voltage is greater than a second predetermined value $E_2 (E_2 > E_1)$.

The electroactive element 51 can be configured so as not to substantially exert a refractive index power in the inactive state. In other words, when a voltage of less than the first predetermined value $E_1$ is applied (or when substantially no voltage is applied), the electroactive material 53 can have substantially the same refractive index as the substrate 52. In such a case, the electroactive element 51 has a substantially constant refractive index across its thickness, so that there is no change in the refractive index.

On the other hand, upon application of a sufficient voltage (the voltage exceeding the second predetermined voltage $E_2$) to cause the director of the cholesteric liquid crystal material included in the electroactive material 53 to align parallel to an electric field to be generated, for example, the electroactive element 51 can be in an active state so as to increase the refractive index. In other words, when a voltage exceeding the second predetermined voltage $E_2$ is applied, the cholesteric liquid crystal material can have a refractive index different from the refractive index of the substrate 52.

For example, when the user is engaged in a long-distance activity such as driving a car, the electroactive element 51 is deactivated, so that the user can have appropriate correction for long distance by the base lens 50a. On the other hand, when the user is engaged in a short or middle-distance activity such as reading a book or viewing a computer screen, the electroactive element 51 is activated, so that the user can have appropriate correction for short distance.

The cholesteric liquid crystal material included in the electroactive material 53 is essentially cholesteric (i.e., chiral or twisted) or it is formed by mixing nematic liquid crystals with a chiral twist agent. In the case of the latter approach, the resultant cholesteric liquid crystals have many of the same properties as the original nematic liquid crystals. For example, the resultant cholesteric liquid crystal material can have the same refractive index dispersion. Moreover, the resultant cholesteric liquid crystal material has the same ordinary and extraordinary refractive indices as the original nematic liquid crystals. More nematic materials are commercially available than cholesteric liquid crystals, and therefore the latter approach is preferable and offers greater design flexibility.

The variable focus eyeglasses can include a driver circuit for applying a predetermined voltage to each of the electrodes 54. The driver circuit is a similar driver circuit to the driver circuit 14 in Embodiment 1, and can operate in such a manner as to apply a predetermined voltage to each of the electrodes 54 in accordance with the user's button operation or suchlike or in accordance with a detection result for the user's predetermined action (e.g., the action of lowering the head). Such a driver circuit can be provided in the temple 22 or the earpiece 26 in the same arrangement as the driver circuit 14 in Embodiment 1.

The power conversion eyeglasses can further include a power source unit connected to the driver circuit so as to be able to control the electroactive element 51. The power source unit has similar components to those of the power source unit 16 in FIG. 2, and operates in a similar manner. Such a power source unit can be provided in the temple 22 or the earpiece 26 in the same arrangement as the power source unit 16.

Next, an example of the present invention will be described.

EXAMPLE 1

Glass Lenses with a weight (7 g each) equivalent to liquid-crystal optical shutters were prepared. A lithium-ion secondary battery having a diameter of 3.5 mm, a length of 35 mm, a weight of 0.8 g, and a battery capacity of 40 mAh was prepared. A resin composition corresponding to a charge/discharge circuit having dimensions of 28.0×3.0×1.2 mm and a weight of 0.15 g was prepared; and a resin composition corresponding to a driver circuit having dimensions of 5.0×80.0×3.0 mm and a weight of 3 g was prepared. The weight of each resin composition was adjusted by including an appropriate amount of metal material in rigid resin.

A resin eyeglass frame in which each temple had a length of about 10 cm and a width (height) of about 7 mm; each earpiece had a length of about 3.8 cm and a width (maximum)

of about 7.3 mm; the total length of the temple and the earpiece (the direct distance between the center of a hinge shaft and the tip of the earpiece) was about 13.5 cm; and the total weight was 32 g was prepared.

The glass lenses were fitted in rims of the eyeglass frame. Also, the secondary battery and the resin composition serving as a substitute for a charge/discharge circuit (referred to below as resin piece B) were combined and taped on the outer side of the left temple near the rear end. Then, the resin composition substituting for a driver circuit (referred to below as resin piece C) was taped on the outer side of the right temple near the rear end.

At this time, resin piece B combined with the secondary battery and resin piece C had centers of gravity at 8 cm from the front edges of their respective temples (the centers of the hinge shafts).

Thereafter, a center-of-gravity position in the front-rear direction of the eyeglasses was obtained using a horizontally placed round resin bar (diameter: 8 mm) as a fulcrum to find a point of balance between the front and rear sides of the eyeglasses. The obtained center-of-gravity position was at 2.7 cm from the front edge of the temple, equivalent to 20% of the total length of the temple and the earpiece.

EXAMPLE 2

A center-of-gravity position in the front-rear direction of the eyeglasses was obtained in the same manner as in Example 1 except that resin piece B combined with the secondary battery and resin piece C had centers of gravity at 9.5 cm from the front edges of their respective temples. The obtained center-of-gravity position was at 3.4 cm from the front edge of the temple, equivalent to 25% of the total length of the temple and the earpiece.

EXAMPLE 3

A center-of-gravity position in the front-rear direction of the eyeglasses was obtained in the same manner as in Example 1 except that resin piece B combined with the secondary battery and resin piece C had centers of gravity at 11 cm from the front edges of their respective temples. The obtained center-of-gravity position was at 4.1 cm from the front edge of the temple, equivalent to 30% of the total length of the temple and the earpiece.

EXAMPLE 4

A center-of-gravity position in the front-rear direction of the eyeglasses was obtained in the same manner as in Example 1 except that resin piece B combined with the secondary battery and resin piece C had centers of gravity at 12 cm from the front edges of their respective temples (the centers of the hinge shafts). The obtained center-of-gravity position was at 4.7 cm from the front edge of the temple, equivalent to 35% of the total length of the temple and the earpiece.

COMPARATIVE EXAMPLE 1

A center-of-gravity position in the front-rear direction of the eyeglasses was obtained in the same manner as in Example 1 except that resin piece B combined with the secondary battery and resin piece C had centers of gravity at 5 cm from the front edges of their respective temples. The obtained center-of-gravity position was at 1.8 cm from the front edge of the temple, equivalent to 13% of the total length of the temple and the earpiece.

For the five types of eyeglasses in Examples 1 to 4 and Comparative Example 1, ten testers evaluated the comfort of wearing. Specifically, the testers were asked to make an either-or decision as to whether the comfort of wearing was good or not after viewing normal television programs for two consecutive hours with any of the fives types of eyeglasses on, and then provide brief written feedback. The comfort of wearing was tested for one type of eyeglasses a day, so that each of the ten testers conducted their evaluation on the five types of eyeglasses in five days. The order of eyeglasses to be worn by the testers was randomly determined for each tester, and the testers were kept from recognizing the tests to be particularly for the center-of-gravity positions. The results for the above are shown in Table 1. Numerical values in the table indicate the number of testers who answered that the comfort of wearing the eyeglasses was good.

|  | Center-Of-Gravity Position Of Eyeglasses (%) | Comfort-Of-Wearing Index (Number Of Testers) |
| --- | --- | --- |
| Example 1 | 20 | 6 |
| Example 2 | 25 | 7 |
| Example 3 | 30 | 8 |
| Example 4 | 35 | 6 |
| Comparative Example 1 | 13 | 0 |

As for Comparative Example 1, many testers felt discomfort due to the viewing device having the center of gravity on the front side at less than 15% from the front end of the temple. Many testers were dissatisfied particularly with the viewing device having frequently slid down, and six testers noted it.

As for Example 1, one tester mentioned sliding down of the viewing device, but the majority of the testers marked the comfort of wearing as "good". As regards Examples 2 to 4, no tester mentioned sliding down of the viewing devices. As regards Example 4, six testers marked the comfort of wearing as "good", but the number of such testers was less than that for Example 3. A conceivable reason for this is that some testers felt discomfort with the center of gravity being situated more rearward compared to weight balance of normal eyeglasses (normally, at about 15% to 30%).

As described above, the optical devices of the embodiments facilitate optimization of their weight balance, making it possible to dramatically improve the comfort of wearing active-shutter stereoscopic image viewing devices and variable focus eyeglasses.

INDUSTRIAL APPLICABILITY

The optical device of the present invention is comfortable to wear, and therefore useful in the form of so-called 3D eyeglasses for long hours of 3D image viewing in a movie theater and 3D image viewing on a 3D television in a household with small children. Moreover, in the form of variable focus eyeglasses to be always worn, a good comfort of wearing provides greater benefit to the user.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

EXPLANATION OF REFERENCE NUMERALS 10 stereoscopic image viewing device
12 optical shutter
14 driver circuit
16 power source unit
22 temple
26 earpiece
28 secondary battery
30 charge/discharge circuit
34 housing portion
50 lens
51 electroactive element

The invention claimed is:

1. An optical device comprising:
   optical components configured to be electrically actuated such that light transmission states are variable;
   a driver circuit for the optical components;
   a power source unit for driving the optical components;
   rims for supporting the optical components;
   temples having front and rear ends, and connected at the front ends to the rims; and
   earpieces formed at the rear ends of the temples,
   the power source unit including:
   a secondary battery having a cylindrical shape with a diameter of 2 mm to 6 mm and having a capacity of 10 to 100 mAh; and
   a charge/discharge circuit for controlling charge and discharge of the secondary battery, wherein:
   the secondary battery is provided near the rear end of the temple or in the earpiece,
   a hollow portion is provided near the rear end of the temple or in the earpiece, and has the secondary battery accommodated therein,
   a center of the gravity of the entire optical device exists between the front end of the temple and a front end of the secondary battery, when viewed from the side, and
   a distance between the front end of the temple and the center of gravity of the entire optical device, when viewed form the side, along a direction in which the temple extends is 15% to 50% of a distance between the front end of the temple and the rear end of the earpiece along the direction in which the temple extends.

2. The optical device according to claim 1, wherein at least a part of the driver circuit or the charge/discharge circuit is provided near the rear end of the temple or in the earpiece.

3. The optical device according to claim 1, wherein the temple or the earpiece is made of resin, and the secondary battery is integrated with a part of the temple near the rear end thereof or with the earpiece, by insert molding.

4. The optical device according to claim 1, wherein the optical component is a liquid-crystal optical shutter driven by the driver circuit in synchronization with switching between two types of images alternatingly displayed on an external image display device.

5. The optical device according to claim 1, wherein the optical component includes an electroactive material whose refractive index varies upon activation through application of a voltage greater than or equal to a predetermined value; and the driver circuit activates the electroactive material by applying the voltage greater than or equal to the predetermined value to the electroactive material.

* * * * *